United States Patent
Belpaire et al.

(10) Patent No.: US 9,672,513 B2
(45) Date of Patent: Jun. 6, 2017

(54) CLOUD BASED PAYMENT METHOD

(71) Applicant: Alcatel Lucent, Boulogne Billancourt (FR)

(72) Inventors: Anthony Belpaire, Ghent (BE); Amol Natu, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/432,623

(22) PCT Filed: Oct. 3, 2013

(86) PCT No.: PCT/EP2013/070603
§ 371 (c)(1),
(2) Date: Mar. 31, 2015

(87) PCT Pub. No.: WO2014/053584
PCT Pub. Date: Apr. 10, 2014

(65) Prior Publication Data
US 2015/0262163 A1    Sep. 17, 2015

(30) Foreign Application Priority Data
Oct. 5, 2012 (EP) ..................................... 12290329

(51) Int. Cl.
*G06G 1/12* (2006.01)
*G06Q 20/00* (2012.01)
(Continued)

(52) U.S. Cl.
CPC ....... *G06Q 20/3278* (2013.01); *G06Q 20/202* (2013.01); *G06Q 10/00* (2013.01);
(Continued)

(58) Field of Classification Search
CPC ........ G06Q 30/00–30/04; G06Q 10/00; G06Q 40/00–40/02; G06Q 20/00–20/04
(Continued)

(56) References Cited

U.S. PATENT DOCUMENTS 7,844,551 B1 * 11/2010 Bottner ................ G06Q 20/085
705/64
2002/0165800 A1 * 11/2002 Ogura ..................... G06Q 30/02
705/26.8
(Continued)

FOREIGN PATENT DOCUMENTS

CN     102542447 A      7/2012
EP     2 447 899 A1     5/2012
WO     WO 2012/109486 A1  8/2012

OTHER PUBLICATIONS

International Search Report for PCT/EP2013/070603 dated Dec. 11, 2013.

*Primary Examiner* — Olusegun Goyea
(74) *Attorney, Agent, or Firm* — Fay Sharpe, LLP

(57) ABSTRACT

A cloud based payment method for payment at a merchant's electronic cash register (202) comprising the steps of: —upfront: A. registering payment credentials (101) of a user; —at check-in of a store of a participating merchant: B1. launching a cloud payment application (211) on a mobile terminal (201) to establish connectivity with a cloud payment service (100); —and at check-out at an electronic cash register (202): C1. identifying (221, 222; 321, 323) the user with the cloud payment service (100) through an identification shared with the cloud payment service (100) via the electronic cash register (202) or via the cloud payment application (211); C2. communicating (222; 322) an amount payable from the electronic cash register (202) to the cloud payment service (100); C3. communicating (223; 324) the amount payable from the cloud payment service (100) to the
(Continued)

cloud payment application (211); C4. receiving (224; 325) confirmation of the amount payable from the user; C5. obtaining (225; 326) payment authorization using the payment credentials (101); and C6. confirming (226; 327) payment from the cloud payment service (100) to the electronic cash register (202).

9 Claims, 3 Drawing Sheets

(51) Int. Cl.
| | | |
|---|---|---|
| *G07B 17/00* | (2006.01) | |
| *G07F 19/00* | (2006.01) | |
| *G06Q 20/32* | (2012.01) | |
| *G06Q 20/20* | (2012.01) | |
| *G06Q 20/02* | (2012.01) | |
| *G06Q 10/00* | (2012.01) | |
| *G06Q 40/00* | (2012.01) | |
| *G06Q 20/04* | (2012.01) | |

(52) U.S. Cl.
CPC ............ *G06Q 20/00* (2013.01); *G06Q 20/02* (2013.01); *G06Q 20/04* (2013.01); *G06Q 40/00* (2013.01)

(58) Field of Classification Search
USPC ........ 705/30, 44, 77, 14.51, 14.73, 26.8, 39, 705/38, 14.36, 14.33; 450/558
See application file for complete search history.

(56) References Cited

U.S. PATENT DOCUMENTS

| | | | | |
|---|---|---|---|---|
| 2002/0181710 A1* | 12/2002 | Adam | ................... | G06Q 20/02 380/270 |
| 2003/0055792 A1* | 3/2003 | Kinoshita | .............. | G06Q 20/04 705/67 |
| 2003/0149662 A1* | 8/2003 | Shore | .................... | G06Q 20/04 705/39 |
| 2005/0216354 A1* | 9/2005 | Bam | ...................... | G06Q 20/12 705/26.1 |
| 2005/0256802 A1* | 11/2005 | Ammermann | ......... | G06Q 20/02 705/44 |
| 2006/0178932 A1* | 8/2006 | Lang | ..................... | G06Q 30/02 705/14.73 |
| 2008/0077486 A1* | 3/2008 | Davis | .................... | G06Q 30/02 705/14.27 |
| 2008/0077526 A1* | 3/2008 | Arumugam | ............ | G06Q 20/40 705/44 |
| 2009/0063312 A1* | 3/2009 | Hurst | ................... | G06Q 20/105 705/30 |
| 2009/0164331 A1* | 6/2009 | Bishop | ................ | G06Q 20/02 705/19 |
| 2009/0259547 A1* | 10/2009 | Clopp | ................ | G06Q 30/0214 705/14.16 |
| 2010/0049651 A1* | 2/2010 | Lang | ..................... | G06Q 30/04 705/38 |
| 2010/0131347 A1* | 5/2010 | Sartipi | ................. | G06Q 20/02 705/14.33 |
| 2011/0040609 A1* | 2/2011 | Hawkins | ................ | G06Q 30/02 705/14.25 |
| 2011/0137804 A1* | 6/2011 | Peterson | .............. | G06Q 20/085 705/77 |
| 2011/0140380 A1* | 6/2011 | Ulrich | ................... | B62B 5/0096 280/33.992 |
| 2011/0237296 A1* | 9/2011 | Coppinger | ............. | G06Q 20/20 455/558 |
| 2011/0251892 A1* | 10/2011 | Laracey | ............. | G06Q 30/0253 705/14.51 |
| 2011/0295750 A1* | 12/2011 | Rammal | ................ | G06Q 20/12 705/44 |
| 2011/0302016 A1* | 12/2011 | Haddad | ............. | G06Q 30/0224 705/14.25 |
| 2011/0307318 A1* | 12/2011 | LaPorte | ................ | G06Q 20/209 705/14.33 |
| 2012/0004972 A1* | 1/2012 | Wengrovitz | ......... | G06Q 20/204 705/14.27 |
| 2012/0005076 A1* | 1/2012 | Dessert | .................. | G06Q 20/10 705/39 |
| 2012/0166270 A1* | 6/2012 | Coppinger | ......... | G06Q 30/0239 705/14.36 |
| 2012/0209630 A1* | 8/2012 | Ihm | .................... | G06Q 20/3274 705/4 |
| 2012/0290478 A1* | 11/2012 | Crofts | .................. | G06Q 20/322 705/44 |
| 2012/0296725 A1* | 11/2012 | Dessert | ............. | G06Q 30/0208 705/14.27 |
| 2012/0296770 A1* | 11/2012 | Lin | .................... | G06Q 30/0601 705/26.8 |

* cited by examiner

CLOUD BASED PAYMENT METHOD

FIELD OF THE INVENTION

The present invention generally relates to payment in physical retail, i.e. payment at a merchant's electronic cash register, with improved user experience. A merchant within the context of the current invention can be a single, independent shop or it may be an enterprise owning multiple stores at different locations.

BACKGROUND OF THE INVENTION

At present, payments in physical retail either happen through exchange of cash money or in a dematerialized manner via payment cards. At check-out of a store, an employee or the customer scans the products in his/her basket and the customer is offered to choice to make a cash payment or card payment.

In case of a cash payment, the customer exchanges coins and/or paper money with the employee or a money terminal and receives a payment receipt. The cash money is stored in an electronic cash register. Cash payments are disadvantageous in several ways. Such cash payments are time consuming for the customer and employee, require the availability of cash money with the customer and the presence of change in the electronic cash register of the store. Cash payments further involve safety measures to avoid theft or assaults, and to secure transfer of the cash money between the store and a bank.

Over the past decennia, dematerialized payments via payment cards, i.e. debit cards or credit cards or virtual cards stored on portable devices equipped with for instance Near Field Communications (NFC) technology, have become very popular. In order to be able to accept dematerialized payments via payment cards, a retail owner has to invest in payment terminals. Typically, each electronic cash register has to be supplemented with at least one payment terminal for contact or contactless payment cards. Such payment terminals require certification and maintenance. In other words, these payment terminals introduce investments and running costs for the retail owner. A further drawback of existing payment cards is that their functionality is restricted to authorizing dematerialized payments. If the customer is entitled to certain benefits because of loyalty, vouchers, reductions, etc., he/she still needs to claim such benefits by showing additional cards, e.g. a loyalty card, or coupons at check-out of the store.

As an alternative to cash payments and card payments, money transactions can be made through an ecommerce application on a portable device, e.g. a smartphone or tablet PC. Existing ecommerce applications however require the customer to execute multiple consecutive steps on a rather small display. In addition, it is not always evident to establish a link between the ecommerce application and the physical retailer resulting in poor user satisfaction.

It is an objective of the present invention to disclose a method, service and application for payment at a merchant's electronic cash register that overcomes the above mentioned drawbacks of existing solutions. More particularly, it is an objective to present a payment method that eliminates the need for installing and maintaining payment terminal infrastructure, enables fast check-out at a physical retail and enhances user experience by eliminating the need to keep loyalty cards, coupons, etc.

SUMMARY OF THE INVENTION

According to the embodiments, the above defined objectives are realized through the cloud based payment method for payment at a merchant's electronic cash register, comprising:
  upfront:
  registering payment credentials of a user with a cloud payment service wherein also participating merchants are registered;
  at check-in of a store of a participating merchant:
  launching a cloud payment application on a mobile terminal of the user, the cloud payment application establishing connectivity with the cloud payment service;
  and at check-out at an electronic cash register of the participating merchant:
  identifying the user with the cloud payment service through an identification shared with the cloud payment service via the electronic cash register or via the cloud payment application;
  communicating an amount payable from the electronic cash register to the cloud payment service;
  communicating the amount payable from the cloud payment service to the cloud payment application;
  receiving confirmation of the amount payable from the user;
  obtaining payment authorization by the cloud payment service using the payment credentials; and
  confirming payment from the cloud payment service to the electronic cash register.

Thus, the invention resides in using a cloud service for payments at a physical point of sales. A cloud payment application installed in the user's smartphone or other portable device connects with a cloud payment service wherein the user has upfront registered its payment credentials, e.g. his debit card(s), credit card(s) and/or bank account numbers. Participating merchants also register with the cloud payment service. The cloud payment application is launched on entry of a store of a participating merchant. The user thereto may login to the payment application or the payment application may be launched automatically upon the user holding his mobile terminal equipped with e.g. an NFC interface on or near a tag exposed at the entrance of the store. Once the application is launched, the user may optionally select the participating merchant, e.g. from a list, in order to confirm the store entered by the user. Alternatively, the application may for instance autonomously select the participating merchant and store based on for instance position information obtained from location determination technology in the mobile terminal. The cloud service connected payment application can now be used at check-out to pay without a need for credit cards, loyalty cards, vouchers, coupons, etc. Thereto, the user has to identify himself at check-out, e.g. by presenting his loyalty ID to the store employee at the electronic cash register or by obtaining a basket ID from the electronic cash register that can be entered in the payment application. Identification of the user through the loyalty ID or basket ID is key to the present invention since the cloud payment service needs to know who is really at the counter. The use of an identifier shared via the electronic cash register with the cloud payment service (e.g. the user's loyalty ID), or obtained from the electronic cash register and shared via the cloud payment application on the mobile terminal with the cloud payment service (e.g. a basket ID), is a crucial element in the invention. Once the user is identified, the electronic cash register shall communicate the amount payable with the cloud payment service, and the latter cloud payment service shall obtain confirmation from the user via the application on his mobile device. In the amount payable, the cloud payment application shall consider the user's loyalty status and eventual vouchers, coupons or reductions that apply to the user. Once the user has confirmed the amount, the cloud payment service uses the stored payment credentials to obtain payment authorization for the confirmed amount from the bank and confirms payment to the electronic cash register.

No payment terminal is involved in the transaction, the user conducts the payment from his smartphone or portable device and automatically sees his loyalty status, vouchers, coupons and other reductions applied which significantly increases the user experience. The loyalty status may be updated automatically, and the communication channel that is opened between the cloud payment service and the application on the user's portable device may be exploited to communicate special deals, temporary reductions, offers or other personalized advertisements between the visited merchant and the user.

In some embodiments, the cloud based payment method according to the current invention further comprises:
  registering one or more loyalty cards of the user with the cloud service; and
  selecting the participating merchant in step B2 through its loyalty card.

Indeed, the user may upfront or on-board register his loyalty cards of participating merchants. At check-in, the application may then display a list of loyalty cards enabling the user to select the participating merchant whose store was entered. The registered loyalty cards in other words may serve as an instrument to conveniently enable the user to select and/or confirm the store entered.

In some embodiments, the cloud based payment method according to the present invention may further comprise:
  communicating a loyalty ID of the user with the merchant from the electronic cash register to the cloud payment service in order to identify the user with the cloud payment service in step C1.

Thus, identification of the user at check-out may rely upon the user showing his loyalty card displayed on his portable device to the cashier, and the cashier using the electronic cash register to communicate the loyalty ID of the user to the cloud payment service. This way, advantage is taken of presence of the user's loyalty cards in the payment application to fast identify the user with the cloud payment service at check-out.

In some embodiments, the cloud based payment method according to the present invention further comprises:
  updating the status of a loyalty card of the user with the merchant after the payment.

Indeed, advantageously, the cloud payment service maintains the loyalty status of the user for all participating merchants where the user has loyalty cards. The cloud payment service after a transaction automatically updates the loyalty status of the user such that store employees no longer have to do this manually, and customers no longer have to carry stamped or stickered loyalty cards of different merchants with them in order to take benefit of their loyalty status.

Further optionally, the cloud based payment method according to some embodiments may comprise:
  obtaining a basket ID from the electronic cash register, the basket ID being a unique identification code for a single payment procedure at the merchant; and
  communicating the basket ID from the cloud payment application to the cloud payment service in order to identify the user with the cloud payment service.

Indeed, as an alternative to identifying the user with the cloud payment service through his loyalty ID, the user may obtain a basket ID from the cashier, e.g. printed on a ticket. The basket ID is a unique number or code generated for the check-out. The user thereupon enters the basket ID in the payment application on his mobile terminal and the payment application shares the basket ID with the cloud payment service. In the meantime, also the electronic cash register may have informed the cloud payment service on the basket ID and the amount payable. Through matching the basket IDs, the cloud payment service can identify the user from which confirmation of the amount payable needs to be obtained. This alternative based on basket IDs enables to use the payment method according to the current invention also in situations where the user has no loyalty ID with the visited merchant that enables quick identification of the customer at check-out.

In some embodiments, the cloud based payment method according to the present invention optionally comprises:
  uploading one or more vouchers or coupons of the user into the cloud payment service;
  modifying the amount payable in view of the vouchers or coupons; and
  communicating a modified amount payable to the electronic cash register and the cloud payment application before receiving confirmation from the user.

Indeed, the user or the participating merchant may upload vouchers or coupons in the cloud payment service and tie them to the user such that they are automatically considered by the cloud payment service to recalculate the amount payable by the user at check-out. The net amount resulting from automated redemption of vouchers and coupons is communicated to the electronic cash register and the user is requested confirmation for the reduced amount payable via the payment application on his portable device. Such automated voucher/coupon discount enhances the user experience significantly because vouchers and coupons no longer have to be collected and carried with the user, and the check-out procedure is fastened since the validity of vouchers and coupons no longer has to be checked manually by the cashier.

The cloud based payment method according to some embodiments may comprise:
  PIN confirmation by the user when the amount payable exceeds a certain threshold.

Thus, each time the amount payable exceeds a predetermined threshold, confirmation by the user may require entering a secure code or PIN number for security reasons. In an advantageous embodiment of the cloud based payment method, selecting the participating merchant comprises:
  determining a location of the mobile terminal through positioning technology integrated in the mobile terminal; and
  producing a list of participating merchants within the neighbourhood of the location thereby enabling the user to make a selection.

Indeed, as an alternative to the user selecting the participating merchant from a long list, the selection process may take benefit of positioning technology such as a GPS receiver, GSM triangulation, etc. that is available in the mobile device, to produce a shortlist of participating merchants that have a store in the neighbourhood of the mobile terminal's location. The user than just has to confirm or select the participating merchant from a limited list which further speeds up the check-in process.

According to yet another optional aspect, the cloud based payment method according to the present invention may comprise:

communicating from the cloud payment service to the cloud payment application offers valid for the user at the merchant.

Thus, the communication channel between the cloud payment service and the cloud payment application on the user's portable terminal that is established at check-in of the store, may be exploited to share additional offers valid for the user during a single visit of the store. This further enhances user experience and enables participating merchants to advertise last-minute offers that are eventually selected based on the user's buy history or interest profile with that merchant.

Embodiments include to a corresponding cloud payment service and a corresponding cloud payment application, both used in the method according to the invention.

DETAILED DESCRIPTION OF EMBODIMENT(S)

The method according to the invention allows very fast check-out at physical retail leveraging just a consumers smartphone without need for payment terminal(s).

Figure 1:
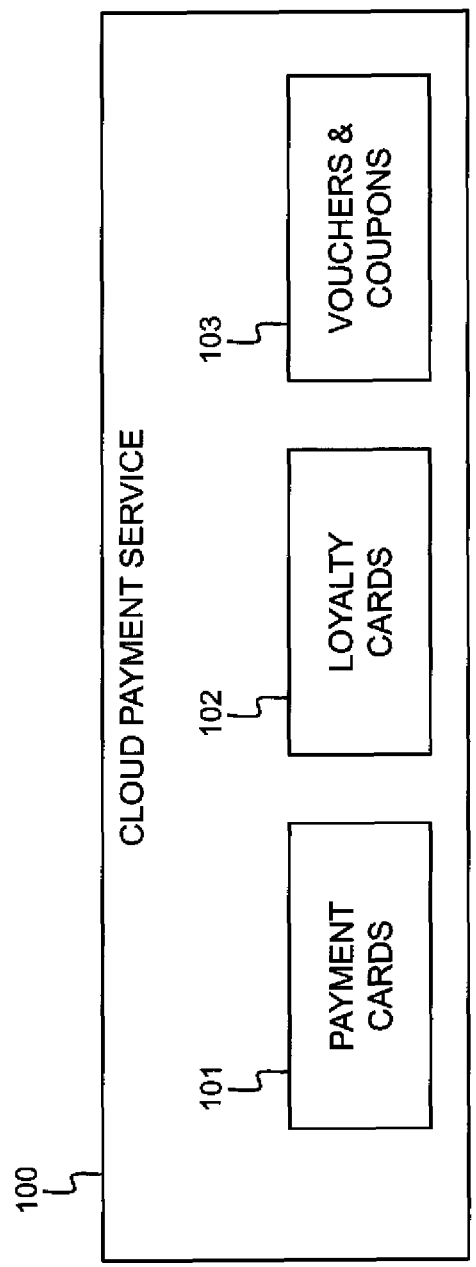
FIG. 1 illustrates the upfront registration procedure in an embodiment of the cloud-based payment method according to the present invention.

The user has to register once with a cloud payment service 100. The result of the upfront registration process is shown in FIG. 1. Via a cloud payment application installed on his smartphone, the user leaves his payment credentials 101, like for instance credit card numbers, bank account information, etc. with the cloud payment service 100. Once this is done, the user can register his loyalty cards 102 of participating merchants, and eventual vouchers and coupons 103 he possesses. The payment credentials 101 will be stored in a secure vault of the cloud storage system, compliant with required standards such as PCI (Payment Card Industry) standards.

When a user enters a shop of a participating merchant, he checks-in by launching the cloud payment application on his smartphone. The user logs-in, and selects the participating merchant whose shop was entered. The selection may be suggested from a list or location based. Since the cloud payment application contains the user's loyalty IDs with participating merchants, the application can allow the user to select the participating merchant from a list of merchants where the user has loyalty IDs, eventually location based filtered if the user's smartphone has positioning technology aboard.

At check-out of the shop, the user shows his loyalty ID displayed on his smartphone screen to the employee at the electronic cash register. The electronic cash register thereupon contacts the cloud payment application which will trigger the user via its smartphone to confirm the amount payable. Once confirmed, the cloud passed payment service confirms the payment authorization to the electronic cash register.

There are several variants and extensions possible. For instance, before asking the user to confirm the amount payable, the cloud based payment service 100 can check if a discount voucher applies for the user, and can then update the net amount payable. This way, the cloud based payment service 100 according to the present invention integrates automated redemption of offers.

In case the user does not yet have a loyalty ID with the participating merchant whose shop is entered, the user can trigger the check-out process by asking the basket ID to the cashier. This basket ID shall typically be a 2 to 4 digit code that the user can enter quickly in the cloud payment application on his smartphone. The cloud based payment service will reconcile this basket ID with the info received from the electronic cash register to continue the process as described above with a request to the user to confirm the amount payable. The two variant check-out procedures, i.e. the check-out procedure based on loyalty ID and the check-out procedure based on basket ID, will be described in more detail in the following paragraphs, with reference to respectively FIG. 2 and FIG. 3.

Figure 2:
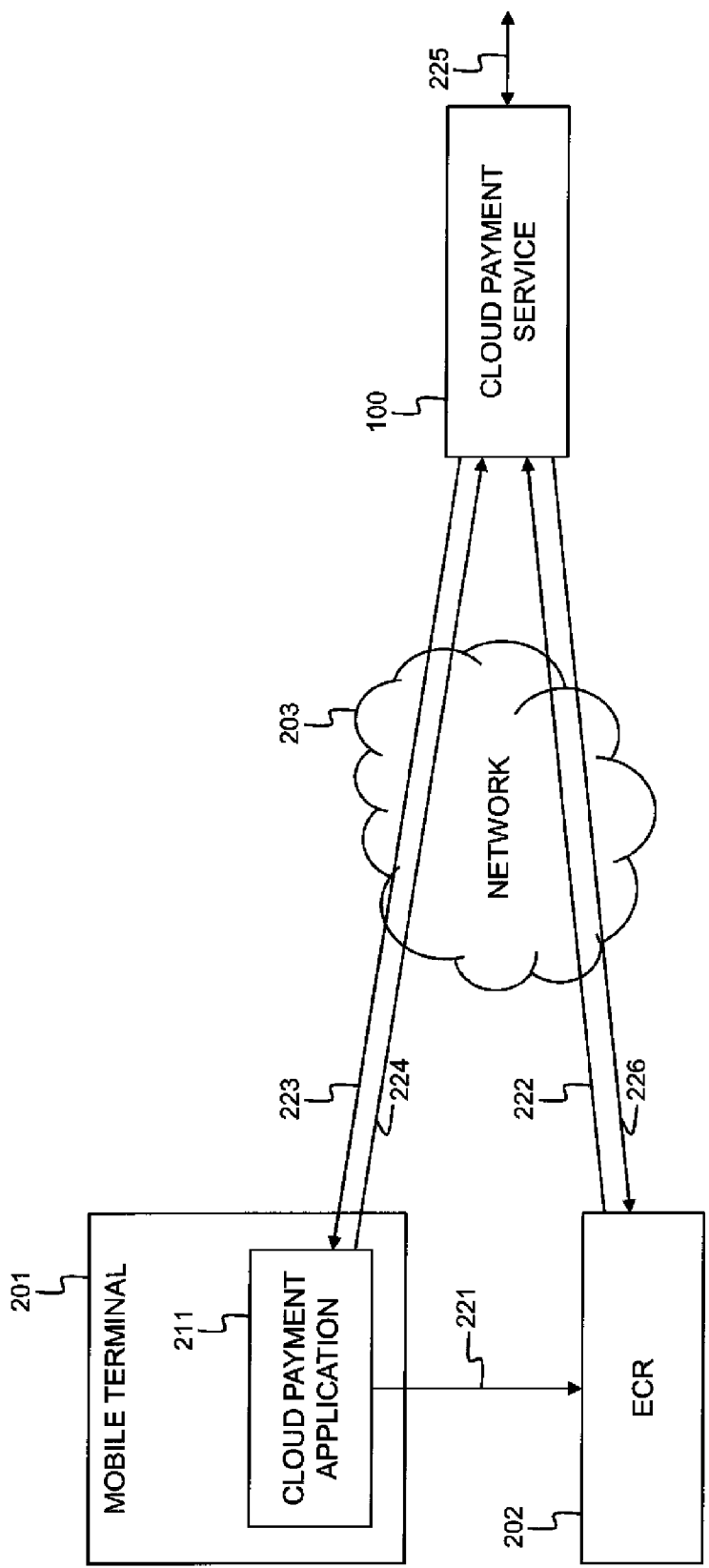
FIG. 2 illustrates the check-out procedure in a first embodiment of the cloud-based payment method according to the present invention.

FIG. 2 shows the check-out procedure based on the user's loyalty ID. In step 221, the user identifies himself by showing his loyalty ID with the participating merchant to the cashier at the electronic cash register 202. The loyalty ID shall typically be visualized by the cloud payment application 211 on the display of the user's smartphone 201. The cashier enters the loyalty ID in the electronic cash register 202. Instead of showing the loyalty ID to the cashier, the loyalty ID may be communicated wirelessly by the cloud payment application 211 to the electronic cash register 202 in step 221, provided the smartphone 201 and the electronic cash register 202 have a common wireless interface like Bluetooth, WiFi, RF, NFC, etc. that enables such transfer.

Once the user is identified through his loyalty ID, the electronic cash register 202 contacts the cloud payment service 100, and communicates the user's loyalty ID, the basket ID and the amount payable with the cloud payment service 100. This is indicated by arrow 222 in FIG. 2. Eventually, message 222 may contain additional information like the product items and volumes purchased by the user.

The cloud payment service 100 will notify the cloud payment application 211 on the user's smartphone 201, and request confirmation of the amount payable. This is indicated by arrow 223 in FIG. 2.

As is further indicated by arrow 224, the user shall confirm the amount payable. Eventually, the cloud payment service 100 shall ask for PIN or password confirmation in message 223 if the amount payable exceeds a certain threshold or ask for confirmation of product article purchase.

Once the cloud payment service 100 has received confirmation in 224, the cloud payment service shall obtain payment authorization from the bank in 225, and confirm payment to the electronic cash register 202 through message 226.

Figure 3:
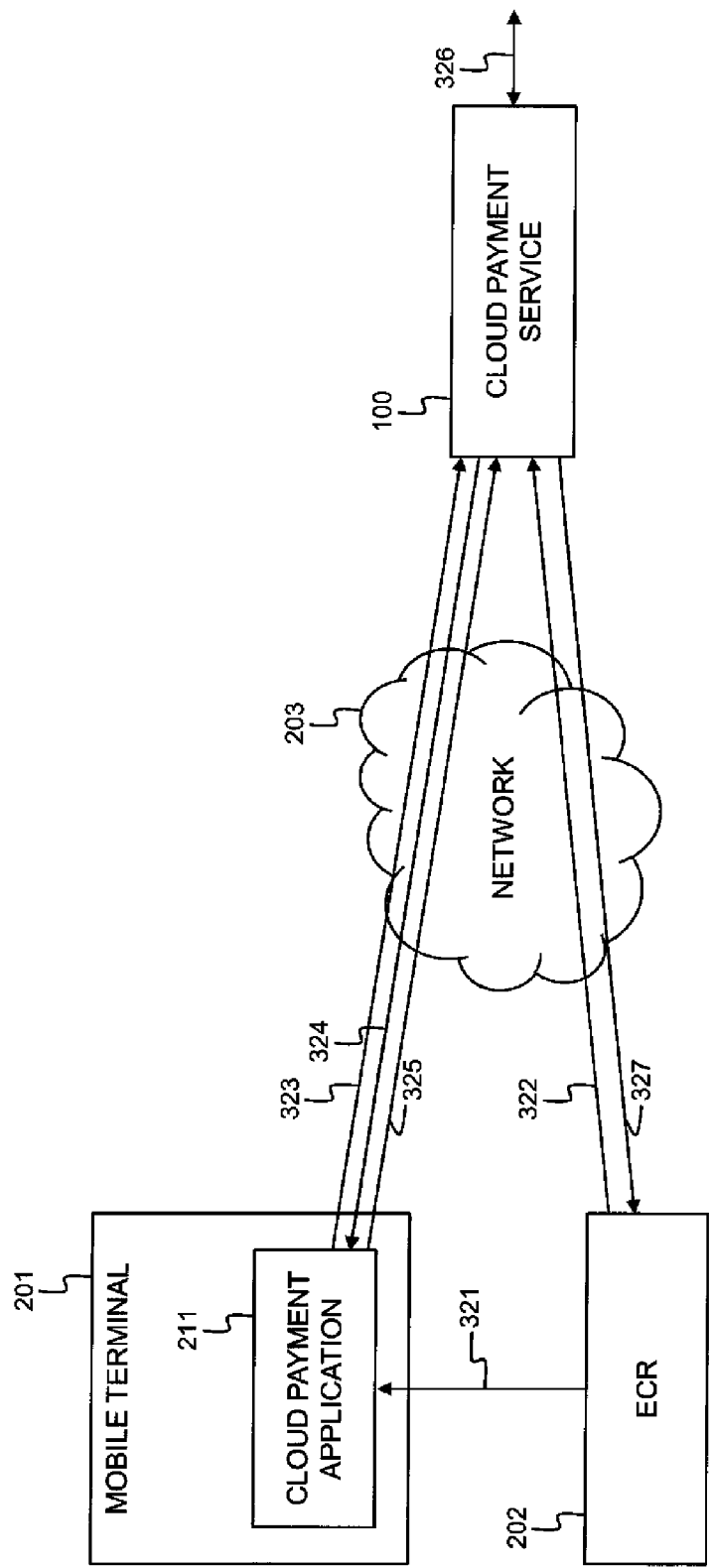
FIG. 3 illustrates the check-out procedure in a second embodiment of the cloud-based payment method according to the present invention.

FIG. 3 illustrates an alternative check-out procedure wherein the basket ID received from the cashier is used to identify the user with the cloud payment service 100.

The user opens the cloud payment application 211 or has already opened the cloud payment application 211 on his mobile terminal 201 when he reaches the electronic cash register 202 in the shop of a participating merchant. The user there says he wants to pay with basket ID and received the basket ID from the cashier. The user enters the basket ID into the cloud payment application 211. This process is indicated by arrow 321 in FIG. 3. The transfer of basket ID to the cloud payment application 211 may be realized over a wireless interface, like for instance Bluetooth, NFC, WiFi, RF, etc. provided both the electronic cash register 202 and the mobile terminal 201 are equipped with such interface.

As is indicated by arrow 322, the electronic cash register 202 in a next step contacts the cloud payment service 100 and shares with the cloud payment service 100 at least the basket ID and the amount payable.

In parallel, the cloud payment application 211 communicates the basket ID to the cloud payment service 100 in message 323.

The cloud payment service 100 will contact the cloud payment application 211 and share in message 324 the amount payable to ask for confirmation by the user. The amount payable may have been adjusted in the meantime if vouchers or coupons are applicable to the user.

Through message 325, the user confirms that the amount payable is correct. The message may eventually also convey the user's PIN or password in case the amount exceeds a certain threshold.

Once the cloud payment service 100 has received confirmation in 325, the cloud payment service shall obtain payment authorization from the bank in 326, and confirm payment to the electronic cash register 202 through message 327.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A cloud based payment method for payment at a merchant's electronic cash register comprising:
upfront:
registering payment credentials of a user with a cloud payment service wherein also participating merchants are registered;
at check-in of a store of a participating merchant:
launching a cloud payment application on a mobile terminal of said user, said cloud payment application establishing connectivity with and logging into said cloud payment service;
and at check-out at an electronic cash register of said participating merchant:
identifying said user with said cloud payment service through an identification shared with said cloud payment service via said electronic cash register or via said cloud payment application;
communicating an amount payable from said electronic cash register to said cloud payment service;
communicating said amount payable from said cloud payment service to said cloud payment application;
receiving confirmation of said amount payable from said user;
obtaining payment authorization by said cloud payment service using said payment credentials; and
confirming payment from said cloud payment service to said electronic cash register;
wherein said identifying said user comprises identification via at least one of a basket ID and a loyalty ID;
wherein identification via said basket ID comprises obtaining a basket ID from said electronic cash register, said basket ID being an identification code for a single payment procedure at said merchant; and communicating said basket ID from said logged in cloud payment application to said cloud payment service and wherein said communicating said amount payable further comprises communicating said basket ID from said electronic cash register to said cloud payment service thereby identifying said user as associated with said single payment procedure to said cloud payment service; and
wherein identification via said loyalty ID comprises said registering of said payment credentials including an association of said payment credentials with said loyalty ID and wherein said communicating said amount payable further comprises communicating said loyalty ID from said electronic cash register to said cloud payment service thereby identifying said user to said cloud payment service.

2. The cloud based payment method according to claim 1, further comprising:
registering one or more loyalty cards of said user with said cloud payment service; and
selecting said participating merchant through its loyalty card.

3. The cloud based payment method according to claim 2, further comprising:
updating a status of a loyalty card of said user with said merchant after said payment.

4. The cloud based payment method according to claim 1, further comprising:
uploading one or more vouchers or coupons of said user into said cloud payment service;
modifying said amount payable in view of said vouchers or coupons; and
communicating a modified amount payable to said electronic cash register and said cloud payment application before receiving confirmation from said user.

5. The cloud based payment method according to claim 1, further comprising:

PIN confirmation by said user when said amount payable exceeds a certain threshold.

6. The cloud based payment method according to claim 1, further comprising:
   selecting said participating merchant by:
      determining a location of said mobile terminal through positioning technology integrated in said mobile terminal; and
      producing a list of participating merchants within the neighbourhood of said location thereby enabling said user to make a selection.

7. The cloud based payment method according to claim 1, further comprising:
   communicating from said cloud payment service to said cloud payment application offers valid for said user at said participating merchant.

8. A cloud payment server comprising at least one processor configured to:
   upfront:
      register payment credentials of an associated user with a cloud payment service provided at least in part, by the server, wherein participating merchants are also registered;
   at check-in of a store of a participating merchant:
      establish connectivity with and log in a cloud payment application of an associated mobile terminal of said user;
   and at check-out:
      identify said user through an identification received from an associated electronic cash register of one of said participating merchants or from said cloud payment application;
      receive an amount payable from said electronic cash register;
      communicate said amount payable to said logged in cloud payment application according to the identification;
      receive confirmation of said amount payable from said user through said logged in cloud payment application;
      obtain payment authorization by using said payment credentials; and
      confirm payment to said electronic cash register;
      wherein being configured to identify said user comprises being configured to identify said user via at least one of a basket ID and a loyalty ID;
      wherein being configured to identify said user via said basket ID comprises being configured to receive a basket ID from said electronic cash register, said basket ID being an identification code for a single payment procedure at said participating merchant and to also receive said basket ID from said logged in cloud payment application thereby identifying said user as associated with said single payment procedure; and
      wherein being configured to identify said user via said loyalty ID comprises being configured to register said payment credentials by including an association of said payment credentials with said loyalty ID and wherein being configured to receive said amount payable further comprises being configured to received said loyalty ID from said electronic cash register, thereby identifying said user to said cloud payment service.

9. A non-transient computer readable medium carrying instructions which when executed by at least one processor of a mobile device cause the mobile device to provide a cloud payment application, said cloud payment application being configured to:
   establish connectivity with and log into a cloud payment server of an associated cloud payment service;
   and at check-out:
   identify a user of said mobile device to said cloud payment server;
   receive an amount payable from an associated electronic cash register or said user;
   receive said amount payable from said logged in cloud payment service according to the identification;
   provide confirmation of said amount payable to said cloud payment server;
   wherein being configured to identify said user comprises at least being configured to receive a basket ID directly or indirectly from said electronic cash register, said basket ID being an identification code for a single payment procedure at said participating merchant and to also receive said basket ID from said logged in cloud payment application, thereby confirming said user as associated with said single payment procedure, and communicate said confirmation to said cloud payment server.

* * * * *